US009258285B2

(12) United States Patent
Rinaldo, Jr. et al.

(10) Patent No.: US 9,258,285 B2
(45) Date of Patent: *Feb. 9, 2016

(54) DEVICE PAIRING VIA HUMAN INITIATED CONTACT

(75) Inventors: John D. Rinaldo, Jr., Bellevue, WA (US); Royce A. Levien, Lexington, MA (US); Robert W. Lord, Seattle, WA (US); Alexander J. Cohen, Mill Valley, CA (US); Mark A. Malamud, Seattle, WA (US); Edward K. Y. Jung, Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1255 days.

This patent is subject to a terminal disclaimer.

(21) Appl. No.: 11/137,859

(22) Filed: May 24, 2005

(65) Prior Publication Data

US 2006/0267860 A1 Nov. 30, 2006

(51) Int. Cl.
*G06F 7/04* (2006.01)
*H04L 29/06* (2006.01)
*H04M 1/727* (2006.01)
*H04M 1/60* (2006.01)
*H04M 1/725* (2006.01)
*H04W 28/18* (2009.01)

(52) U.S. Cl.
CPC ............ *H04L 63/08* (2013.01); *H04L 63/0492* (2013.01); *H04M 1/727* (2013.01); *H04M 1/7253* (2013.01); *H04M 1/6033* (2013.01); *H04M 1/72502* (2013.01); *H04M 2250/12* (2013.01); *H04W 28/18* (2013.01)

(58) Field of Classification Search
CPC . H04L 63/08; H04L 63/0861; H04L 63/0876; H04L 63/10; H04W 4/008; H04W 12/06; H04W 12/08
See application file for complete search history.

(56) References Cited

U.S. PATENT DOCUMENTS

| | | | |
|---|---|---|---|
| 5,805,672 A | 9/1998 | Barkat | |
| 6,377,825 B1 | 4/2002 | Kennedy | |
| 6,961,541 B2 | 11/2005 | Overy et al. | |
| 7,072,886 B2 * | 7/2006 | Salmenkaita et al. | |
| 7,363,505 B2 | 4/2008 | Black | |
| 7,778,601 B2 * | 8/2010 | Seshadri et al. | 455/41.2 |
| 7,925,022 B2 | 4/2011 | Jung et al. | |
| 2002/0137505 A1 | 9/2002 | Eiche | |
| 2003/0162556 A1 * | 8/2003 | Libes | 455/507 |
| 2003/0220765 A1 * | 11/2003 | Overy et al. | 702/158 |
| 2003/0226041 A1 * | 12/2003 | Palmer et al. | 713/202 |
| 2004/0123106 A1 * | 6/2004 | D'Angelo et al. | 713/171 |
| 2004/0124966 A1 * | 7/2004 | Forrest | 340/5.8 |
| 2004/0248513 A1 * | 12/2004 | Glass et al. | 455/41.1 |
| 2005/0044372 A1 * | 2/2005 | Aull et al. | 713/176 |

(Continued)

OTHER PUBLICATIONS

"Cellport Announces First Universal, Hands-Free Cell Phone System for Cars"; Intelligent Transportation Society of America; Bearing a date of Jul. 16, 2001; pp. 1-2; printed on Feb. 24, 2006; located at: http://www.itsa.org/itsnews.nsf/key/5FAA?OpenDocument; Intelligent Transportation Society of America.

(Continued)

*Primary Examiner* — Fatoumata Traore

(57) ABSTRACT

A system may include and/or involve a first device, a second device, and logic to effect pairing of the first and second devices upon activation of contact sensors of both the first and second devices.

17 Claims, 3 Drawing Sheets

(56) References Cited

U.S. PATENT DOCUMENTS

| | | | |
|---|---|---|---|
| 2005/0266798 | A1 | 12/2005 | Moloney et al. |
| 2006/0019605 | A1 | 1/2006 | Shau |
| 2006/0046719 | A1* | 3/2006 | Holtschneider ............... 455/434 |
| 2006/0116107 | A1 | 6/2006 | Hulvey |
| 2006/0267860 | A1 | 11/2006 | Rinaldo, Jr. et al. |
| 2007/0173212 | A1 | 7/2007 | Mergler |
| 2008/0166966 | A1* | 7/2008 | Hamasaki et al. ........... 455/41.2 |

OTHER PUBLICATIONS

"eCash on the Move at Volkswagen"; iButton Applications/Dallas Semiconductor MAXIM, Bearing a date of 2006; pp. 1-2; printed on Feb. 27, 2006; located at: http://www.maxim-ic.com/products/ibutton/applications/index.cfm?Action=DD&id=21; Maxim Integrated Products.

"Ecma welcomes ISO/IEC adoption of NFC Standard for short range wireless communication"; ecma International; Bearing a date of Dec. 8, 2003; printed Feb. 24, 2006; pp. 1-3; located at: http://www.ecma-international.org/news/Ecma-340-NFCIP-1.htm.

"Industry giants tout touch computing"; Computing; Bearing the dates of 1995-2006; pp. 1-2; printed Feb. 24, 2006; located at http://www.computing.co.uk/vnunet/news2124597/industry-giants; vnu business publications.

Kiser, Ken; "Newall Electronics Introduces Wearable DRO Technology"; Industrial Product News Online; pp. 1-2; printed Feb. 24, 2006; located at: http://www.ipnews.com/archives/dro/jan02/newall%5Felect.htm.

Cameron, Casey et al.; "Knuckletop Computing: The Java Ring"; pp. 1-4; located at: http://java.sun.com/features/1998/03/rings.html.

Lewis, John; "Put on your human-machine interface"; Design News; Bearing dates of Aug. 20, 2001 and 1997-2006; pp. 1-4; printed Feb. 24, 2006; located at: http://designnews.com/article/CA150040.html; Reed Business Information.

"Mass Transit in Istanbul, Turkey" and "Parking in Argentina"; iButton Applications/Dallas Semiconductor MAXIM; Bearing a date of 2006; pp. 1-3; printed Feb. 27, 2006; located at: http://www.maxim-ic.com/products/ibutton/applicatons/index.cfm?Action=DD&id=8; Maxim Integrated Products.

"Near Field Communication"; What You Need to Know About; Bearing a date of 2006; pp. 1-3; printed on Mar. 3, 2006; located at: http://experts.about.com/e/n/ne/Near_Field_Communication.htm; About, Inc.

"Near Field Communication"; Wikipedia; Bearing a date of Feb. 17, 2006; pp. 1-2; printed on Feb. 24, 2006; located at: http://en.wikipedia.org/wiki/Near_Field_Communication.

"Secure Website Logon and Transactions"; iButton Applications; Bearing a date of 2004; pp. 1-2; printed on Mar. 3, 2006; located at: http://72.14.207.104/search?q=cache:4JM396tN_ToJdb.maxim-ic.com/ibutton/applications/index.cfm; Maxim/Dallas Semiconductor Corp.

"Miscellaneous Voice Pairing Material," miscellaneous publications.

"Miscellaneous Sources for Near Field Communications," miscellaneous publications.

ECMA International, "Near Field Communication," Ecma/TC32-TG19/2004/1.

* cited by examiner

DEVICE PAIRING VIA HUMAN INITIATED CONTACT

TECHNICAL FIELD

The present disclosure relates to the pairing of two devices for trusted cooperation.

BACKGROUND

Pairing involves establishing a secure and/or trusted wireless communication channel between devices. Pairing is becoming more common in a world increasingly populated by cooperating devices. However, the mechanisms for pairing devices remain relatively primitive and do not take advantage of the rich variety of ways in which people and devices may interact with and among one another.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A device may include and/or involve at least one contact sensor, and logic to cause the device to, upon activation of the contact sensor, wait for a signal from another device indicating that the other device has been touched, and upon receiving the signal, undertake pairing with the other device. The logic to cause the device to, upon activation of the contact sensor, wait for a signal from another device indicating that the other device has been touched, and upon receiving the signal, undertake pairing with the other device may include and/or involve logic to cause the device, upon activation of the contact sensor, to wait for a limited amount of time for the signal indicating that the other device has been touched, and if such signal is not received within the limited amount of time, to cause the device to stop waiting for the signal, and/or one or more one touch-sensitive areas, temperature-sensitive areas, or conductivity-sensitive areas.

The device may include and/or involve logic to detect increasing proximity with the other device and to interpret activation of the contact sensor, in conjunction with recently detected increasing proximity with the other device, as an indication that preparation to pair with the other device should be initiated.

The device may include and/or involve logic to enable the device to wirelessly exchange with the other device information needed for pairing, upon approaching or becoming proximate with the other device, but prior to activation of the contact sensor, and logic to interpret activation of the contact sensor as an indication that the information should be applied to complete the pairing process upon receiving the signal indicating that the other device has been touched.

The device may include and/or involve logic to enable the device to exchange with the other device information needed for pairing via physical contact points of the device and the other device.

The device may include and/or involve logic to interpret activation of the contact sensor as an indication to initiate exchange with the other device of at least some of authentication, authorization, or compatibility information needed for pairing, and to interpret the signal indicating that the other device has been touched as an indication that the authentication, authorization, or compatibility information should be applied to complete pairing with the other device.

The device may include and/or involve logic to interrupt the pairing process if contact with the device or other device is broken.

The device may include and/or involve logic to enable the device to wirelessly exchange with the other device information needed for pairing only during activation of the contact sensor of the device, or only during activation of the contact sensor of the device and after receiving the signal indicating that the other device has been touched.

The device may include and/or involve logic to authenticate and/or authorize pairing with the other device.

The device may include and/or involve logic to establish a secure channel between the device and the other device for communication of pairing information.

The device may include and/or involve logic to ascertain a manner in which contact with the device is accomplished. The logic to ascertain a manner in which contact with the device is accomplished may include and/or involve logic to ascertain relative motion between the device and a finger that is contacting the device. The logic to ascertain relative motion between the device and a finger that is contacting the device may include and/or involve logic to ascertain at least one of rotation, angle of incidence, or relative lateral and/or circular motion between the device and the finger.

The device may include and/or involve logic to ascertain relative motion between the device and the other device. The logic to ascertain relative motion between the device and the other device may include and/or involve logic to ascertain at least one of rotation of one device with respect to the other, angle between the devices, or relative lateral motion of the devices.

The device may include and/or involve logic to detect a duration of contact and to interpret the duration of contact as an indication of how and/or whether pairing of the device and the other device should proceed.

The device may include and/or involve logic to detect multiple instances of contact and to interpret the multiple instances of contact as an indication of how and/or whether pairing of the device and the other device should proceed.

The device may include and/or involve logic to detect an intensity of contact and to interpret the intensity of contact as an indication of how and/or whether pairing of the device and the other device should proceed. The logic to detect an intensity of contact and to interpret the intensity of contact as an indication of how and/or whether pairing of the device and the other device should proceed may include and/or involve logic to detect at least one of an average contact force, a peak contact force, or a force gradient.

The device may include and/or involve logic to communicate wirelessly with at least one device different than the other device to obtain information needed to effect pairing with the other device. The at least one device different than the other device may include and/or involve at least one of a proximate desktop, a laptop, or a handheld computing device.

The device may include and/or involve logic to await and employ user input as a result of activation of the contact sensor and signal indicating that the other device has been touched. The logic to await and employ user input as a result of activation of the contact sensor and signal indicating that the other device has been touched may include and/or involve logic to await and employ authentication information for the user, and/or logic to await and employ at least one of input from a keypad, voice input, or biometric input.

The device may include and/or involve logic to authorize an extent of pairing of the device and the other device. The logic to authorize an extent of pairing of the device and the other device may include and/or involve logic to authorize paired access to a greater number and/or different functions of one or both devices than would be available if the devices were paired without each device being touched, and/or logic to authorize paired access the extent of which varies according to the manner and/or point of physical contact with the device and/or the other device, and/or logic to authorize that a person using one or both devices is authorized to do so, and/or to what extent, and/or logic to determine an extent of pairing based at least in part upon which device is touched first. The logic to authorize paired access the extent of which varies according to the manner and/or point of physical contact with the device and/or the other device may include and/or involve logic to authorize paired access the extent of which varies according to an amount of area touched on one or both devices.

The device may include and/or involve logic to provide one or more audible and/or visual and/or tactile indications on the progress and/or results of pairing of the device and other device. The logic to provide one or more audible and/or visual and/or tactile indications on the progress and/or results of pairing of the device and other device may include and/or involve at least one menu of pairing options, and/or logic to provide an indication that a user should provide input to the pairing process, and/or logic to provide a first indication when the first device is touched, and logic to provide a second indication when the second device is touched, and/or logic to provide at least one of one or more lights, tones, vibrations, sounds, or display indications, and/or at least one of logic to provide an indication that the pairing was successful, an indication that the pairing was unsuccessful due to insufficient available information, an indication that the pairing between the devices is available, or an indication that the pairing is in process. The logic to provide an indication that a user should provide input to the pairing process may include and/or involve logic to provide an indication that the user should provide at least one of a password, a spoken input, a biometric input, or information from a card and/or memory device.

A method may include and/or involve detecting physical contact of a person with a first device and/or with a second device, and effecting pairing between the first and second device as a result of detecting the physical contact of the person with the first and/or the second devices.

The method may include and/or involve effecting pairing between devices upon detection of simultaneous physical contact with both devices by the person.

The method may include and/or involve detecting contact with the first device, followed by contact with the second device, as an indication that pairing of the devices should be effected.

The method may include and/or involve wirelessly exchanging information needed for pairing between the devices, upon the devices becoming proximate with one another, but prior to contact with the devices, and interpreting contact with the devices as an indication to complete pairing of the devices.

The method may include and/or involve the devices exchanging information needed for pairing via points where the devices are touched.

The method may include and/or involve touching a first of the devices initiating exchange between the devices of at least some of authentication, authorization, or compatibility information needed for pairing.

The method may include and/or involve interrupting the pairing process if contact is lost with one or both of the devices.

The method may include and/or involve the devices wirelessly exchanging pairing information only during a time when contact is made with one or both of the devices.

The method may include and/or involve ascertaining a manner in which contact with one or both devices is accomplished. Ascertaining a manner in which contact with one or both devices is accomplished may include and/or involve ascertaining the manner in which one or more fingers touch one or both devices. Ascertaining the manner in which one or more fingers touch one or both devices may include and/or involve ascertaining at least one of rotation, angle of approach, or relative lateral motion of one or more fingers at one or more points of contact with one or more of the devices.

The method may include and/or involve ascertaining relative motion between the devices. Ascertaining relative motion between the devices may include and/or involve ascertaining at least one of rotation, relative angle, or relative lateral motion of the devices.

The method may include and/or involve interpreting a duration of contact with one or both devices as an indication of how and/or whether pairing of the devices should proceed and/or be accomplished.

The method may include and/or involve interpreting multiple instances of contact with one or both devices as an indication of how and/or whether pairing of the devices should proceed and/or be accomplished.

The method may include and/or involve interpreting the intensity of contact with one or both devices as an indication of how and/or whether pairing of the devices should proceed and/or be accomplished. Interpreting the intensity of contact with one or both devices as an indication of how and/or whether pairing of the devices should proceed and/or be accomplished may include and/or involve interpreting at least one of an average contact force, a peak contact force, or a force gradient as the indication of how and/or whether pairing of the devices should proceed and/or be accomplished.

The method may include and/or involve the devices communicating wirelessly to obtain information needed to effect pairing with one another.

The method may include and/or involve prompting for user input as a result of contact occurring with one or both devices. Prompting for user input as a result of contact occurring with one or both devices may include and/or involve prompting for authentication information for the user, and/or providing an indication that the user should provide at least one of input from a keypad, voice input, or biometric input.

The method may include and/or involve authorizing an extent of pairing of the devices according to at least one of identification of one or both of the devices, or identification of a user of one or both of the devices. Authorizing an extent of pairing of the devices according to at least one of identification of one or both of the devices, or identification of a user of one or both of the devices may include and/or involve authorizing access to a greater number and/or different functions of one or both devices than would be available if the devices were paired without contact taking place to one or both devices, and/or authorizing access to functions and/or features of one or both devices to an extent of which varies according to the manner and/or point of contact with one or both devices, and/or authorizing that the user may use one or both devices, and/or to what extent.

The method may include and/or involve providing one or more audible and/or visual and/or tactile indications on the progress and/or results of pairing of the devices.

A system may include and/or involve a first device, a second device, and logic to effect pairing of the first and second devices upon activation of contact sensors of both the first and second devices.

The system may include and/or involve logic to detect increasing proximity between the devices and to interpret activation of one or both of the contact sensors, in conjunction with recently detected increasing proximity between the devices, as an indication that preparation to pair the devices should be initiated.

The system may include and/or involve logic to enable the devices to wirelessly exchange information needed for pairing, upon the devices approaching or becoming proximate with one another, but prior to activation of contact sensors of one or both devices, and logic to interpret activation of the contact sensors of one or both devices as an indication that the information should be applied to complete the pairing process.

The system may include and/or involve logic to enable the devices to exchange information needed for pairing via physical contact points of the devices.

The system may include and/or involve logic to interpret activation of the contact sensors of one or both devices as an indication to initiate exchange between the devices of at least some of authentication, authorization, or compatibility information needed for pairing, and to interpret signals indicating that the devices have been touched as an indication that the authentication, authorization, or compatibility information should be applied to complete pairing between the devices.

The system may include and/or involve logic to interrupt the pairing process if contact with one or both devices is broken.

The system may include and/or involve logic to enable the devices to wirelessly exchange information needed for pairing only during activation of contact sensors of both devices.

The system may include and/or involve logic to authenticate and/or authorize pairing between the devices.

The system may include and/or involve logic to establish a secure channel between the devices for communication of pairing information.

The system may include and/or involve logic to ascertain a manner in which contact with one or both devices is accomplished. The logic to ascertain a manner in which contact with one or both devices is accomplished may include and/or involve logic to ascertain relative motion between one or both devices, and/or a finger or fingers contacting one or both devices. The logic to ascertain relative motion between one or both devices, and/or a finger or fingers contacting one or both devices may include and/or involve logic to ascertain at least one of rotation, angle of incidence, or relative lateral and/or circular motion between the devices and/or the fingers and the devices.

The system may include and/or involve logic to ascertain relative motion between the devices. The logic to ascertain relative motion between the devices may include and/or involve logic to ascertain at least one of rotation of one device with respect to the other, angle between the devices, or relative lateral motion of the devices.

The system may include and/or involve logic to detect a duration of contact with one or both devices and to interpret the duration of contact as an indication of how and/or whether pairing of the devices should proceed.

The system may include and/or involve logic to detect multiple instances of contact with one or both devices and to interpret the multiple instances of contact as an indication of how and/or whether pairing of the devices should proceed.

The system may include and/or involve logic to detect an intensity of contact with one or both devices and to interpret the intensity of contact as an indication of how and/or whether pairing of the devices should proceed. The logic to detect an intensity of contact with one or both devices and to interpret the intensity of contact as an indication of how and/or whether pairing of the devices should proceed may include and/or involve logic to detect at least one of an average contact force, a peak contact force, or a force gradient.

The system may include and/or involve logic to communicate wirelessly with at least one device different than the devices being paired in order to obtain information needed to effect pairing between the devices. The at least one device different than the devices being paired may include and/or involve at least one of a proximate desktop, a laptop, or a handheld computing device.

The system may include and/or involve logic to await user input as a result of activation of contact sensors of one or both devices. The logic to await user input as a result of activation of contact sensors of one or both devices may include and/or involve logic to await authentication information for the user, and/or logic to await at least one of input from a keypad, voice input, or biometric input.

The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without each device being touched, and/or logic to authorize paired access the extent of which varies according to the manner and/or point of physical contact with one or both devices, and/or logic to authorize that a person using one or both devices is authorized to do so, and/or to what extent, and/or logic to determine an extent of pairing based at least in part upon which device is touched first. The logic to authorize paired access the extent of which varies according to the manner and/or point of physical contact with one or both devices may include and/or involve logic to authorize paired access the extent of which varies according to an amount of area touched on one or both devices.

The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve at least one menu of pairing options, and/or logic to provide an indication that a user should provide input to the pairing process, and/or logic to provide a first indication when the first device is touched, and logic to provide a second indication when the second device is touched, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available or an indication that pairing is in process. The logic to provide an indication that a user should provide input to the pairing process may include and/or involve logic to provide an indication that the user should provide at least one of a password, a spoken input, a biometric input, or information from a card and/or memory device.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functional

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Figure 1:
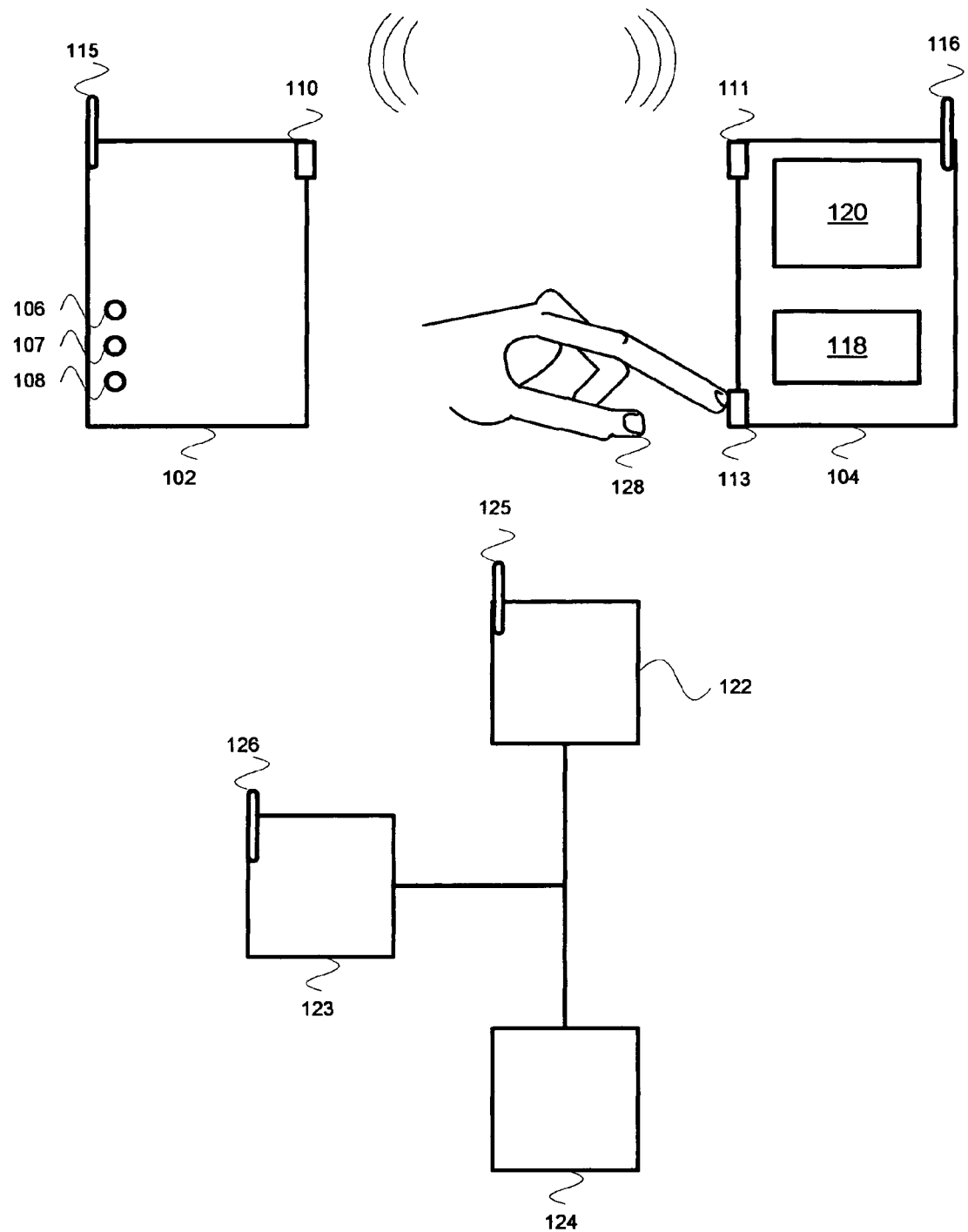
- FIG. 1 is a block diagram of an embodiment of a device pairing arrangement.

FIG. 1 is a block diagram of an embodiment of a device pairing arrangement.

Overview of FIG. 1

A device 102 includes a microphone 106, a speaker 107, a LED 108, an antenna 115 and a contact area 110. There may be more than one contact area 110. The contact area 110 may be incorporated in a complex device part such as a touch sensitive screen incorporating other functions such as display. The contact area 110 or areas may be any part of the device 102 which may be touched by an individual 128 to effect pairing with another device 104.

The microphone 106 may be used for audible input to the device 102 and may not be present in all embodiments. Audible input may include sounds such as tapping or voice input such as whistling or speaking. Voice input may be processed into words and/or phrases, and/or it may be processed as a sound pattern (e.g. a voice print). Voice input may be used, at least in part, as a biometric for individual identification.

The speaker 107 and LED 108 may be used for audible and visual information conveyed from the device 102. Information conveyed from the device 102 may include requests that an individual perform an action, and/or feedback on the condition of some operation the device 102 may have performed or may be performing (such as pairing). The speaker 107 and/or LED 108 may not be present in all embodiments. Other mechanisms of communicating information such as a buzzer, display, tactile surface may be present additionally or instead of the speaker 107 and/or LED 108.

Feedback may be communicated to the user in various ways, such as those described above using speakers, LEDs, other device outputs, or via some other proximate device such as device 122.

The device 102 may include an antenna 115 for wireless communication with other devices. The device 102 may include other features such as a scanner, a camera, or cellular telephone capabilities.

Examples of devices 102 and 104 include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104 includes an antenna 116, contact areas 111 and 113, logic 118, and a display 120. The antenna 116 enables wireless communication between the device 104 and other devices.

The device 104 may have a single contact area, or, as shown, two or more contact areas 111, 113. The contact area of areas 111, 113 may be any part of the device 104 which may be touched by an individual 128 to effect pairing.

The device 104 need not include a display 120, although a display may prove useful for certain aspects of the pairing process. The display 120 could be part of the first device 102, or some other device such as device 122.

The logic 118 operates to effect techniques of the device pairing arrangement and acts for pairing devices 102 and 104. The logic 118 may exist on the first device 102, the second device 104, or in part on both devices 102 and 104. The logic 118 may exist, at least in part, on other devices, such as devices 122 and/or 124. The devices 122 and 124 may comprise a proximate laptop, a desktop, or other computing device, and/or supporting network and communication equipment.

The display 120 may be used to provide information to an individual or individuals such as the person or persons touching the devices 102, 104. In some embodiments, other mechanisms of communicating information such as an LED, buzzer, or speaker may be present additionally or instead of the display 120 on either or both of devices 102 and 104, and/or a proximate device such as 122.

The devices 102 and/or 104 may include other features not described herein. The devices 102 and/or 104 may include a laptop, desktop, tower, or server computer attached via wireless or wired communications to an Intranet and/or the Internet and providing, for example, a sophisticated application such as a medical patient monitoring station or machine control application for a machine tool.

The logic 118 for devices 104 and/or 102 may include a capability to recognize that the device 102 and/or 104 is being touched by a person as versus an inanimate object. The capability to recognize that the device 102, 104 is being touched by a person may include a capability to identify or otherwise authenticate the touching individual through the contact point 110 111 or 113. In some embodiments, one or both of devices 102, 104 may not need to or have the capability of recognizing that a person is directly performing the touching. For example, a person might touch one device 102 using a finger and the other 104 using a pointer, and thus initiate pairing.

The device pairing arrangement may also include additional devices, such as devices 122, 123, and 124. Various data, logic, resources, and capabilities, including information and logic, to accomplish the pairing process may be provided by these other devices 122, 123, and 124. The devices 102 and/or 104 to pair may communicate with one or more of the devices 122-124 using wireless or other types of communication during the pairing process.

By way of example, the device 123 may provide a network access point for a wired and/or wireless network. Thus, for example, the device 123 may include an antenna 125. The antenna 125 may enable one or both of devices 102,104 to communicate via a network with other devices, such as device 124, located remotely from device 102,104. Such communication may enable devices 102 and/or 104 to receive additional information from device 124 that may assist in the pairing process. Some of the logic 118 used to effectuate pairing including even in some cases the decision to pair may be embodied in a remote device or devices 124.

Pairing

The device pairing arrangement includes a first device 102, a second device 104, and logic 118 to effect pairing of devices 102,104 upon detection that touching of both devices 102,104 has occurred. Some functions of the logic 118 will be exercised at various times in various embodiments. For example, when devices 102 and 104 possess wireless capabilities, they may exchange some information prior to touching as well as potentially during and/or after. However, pairing will only occur if both devices 102 and 104 have been touched.

Pairing involves cooperative operation of the two devices 102,104, generally involving communication between the devices 102,104. Effecting pairing may involve actions such as identifying either one or both devices 102,104 or one or more device characteristics, features, and/or functions; identifying (authenticating) the person or some characteristic of the person using the devices 102,104; authorizing the pairing and/or to what extent; and configuring one or both of the devices 102,104 with settings and information to facilitate paired operation.

Effectuating pairing involves communication of information. Information may be communicated in various ways, including using the contact points 110 and 111 or 113, wirelessly, or using some wired communication method, or combinations thereof. An example of communicating information via a contact point 111 would be the use of a pen or ring having communication capabilities to touch device 104. The touching might, along with a touch of the first device 102, effect the initiation of pairing and during the same contact the pen device might communicate information about the identity of the touching individual 128 to device 104 which would be used for authentication by the logic 118. As a second example, a person might touch a contact point 110 on device 102 using a cable. The person might then touch a contact point 113 on device 104 using the other end of the cable. Devices 102 and 104 might then communicate to effect pairing using their contact points 110 and 113. After pairing is effected, they might continue to communicate but in some other manner, such as wirelessly. The use of a special cable to effect pairing may also act as an authentication/authorization mechanisms as individuals not possessing the cable would be unable to effect pairing.

Information to facilitate pairing may be communicated between the two devices 102,104, or almost entirely from one device to another. For example, device 102 may consist of a medallion or ring with containing stored value (similar in concept to a prepaid phone card) which is used primarily to accomplish a commercial transaction. After device 102 is touched at its contact point 110, device 102 may use its antenna 115 to pass information about the stored value to device 104. Device 104 may then perform many, most, or all actions involved necessary to establish pairing, such as identifying the commercial transaction and deciding if it may be accomplished. (The user may be interacting through a touch screen display 120 or keyboard or verbally with device 104 during this period.). Device 104 may then initiate pairing. While the two devices are paired, device 104 may pass information about the commercial transaction back to device 102.

The information exchanged, and the direction of such exchange, may vary as pairing proceeds. For example, the device 102 might pass information about a desired common purpose to the device 104, along with capabilities of the device 102. The device 104 may determine if it is suitable to provide the common service with device 102, and notify device 102 of this decision. The device 102 may then pass information authenticating the person using it to the device 104. And so on.

Sometimes, effectuation of pairing may at times require an individual to provide an input to one or both of the devices 102,104, or to perform an action. For example, the user of the device 102 and/or 104 may have to enter a password or provide a biometric input before pairing will be accomplished. The user may have to speak his or her name, to be validated biometrically. The individual may have to present a finger to a scanner for biometric fingerprint identification. In some situations, the contact point such as 110 may also have biometric capability. For example, the contact point 110 might have fingerprint scanning capability.

Effectuation of pairing may in some instances involve access to information and processing capability external to the two pairing devices 102,104. For example, if an individual provides a biometric input to device 102, it might use the antenna 115 to communicate the fingerprint information wirelessly to device 123 via the antenna 126. Device 123 might then provide the fingerprint information, via a network, to device 124 for authentication and authorization of the user's permission to pair device 104 with device 102.

The information needed to effect pairing may be passed using a variety of physical medium. Some or all of the information needed to effect pairing may be communicated through the contact point of the two devices 102,104 as in the examples of the touching pen and the touching cable provided above. Some or all of the information needed to effect pairing may be communicated using a wireless capability of either or both devices 102,104. Either or both of devices 102,104 may implement wired or wireless network connectivity, so that some or all of the information needed to effect pairing may be communicated to one or both devices via a communication network.

One or both devices 102,104 may be paired with some other device (not shown) at the time the devices 102,104 are touched. Depending on the circumstances, the original pairing or pairings may be terminated, and a pairing between the devices 102,104 effected. Or, a second pairing may occur between devices 102,104 and one or more original pairings may continue. In some circumstances, when the two devices 102,104 are touched, pairing may be rejected if one or both devices 102,104 are already paired.

Contact

The system may include a first device 102, a second device 104, and logic 118 to effect pairing of the first 102 and second devices 104 upon activation of contact sensors 110 and 111 or 113 of both devices 102 and 104. The logic 118 may operate to interpret touching, e.g. activation of the contact sensors, of one or both devices 102 and/or 104 as an indication to initiate exchange between the devices 102,104 of at least some of authentication, authorization, compatibility and/or configuration information needed for pairing. Under these circumstances, this information may be passed during or after touching has occurred. Again, although the logic 118 is illustrated with respect to device 104, the logic may in fact exist wholly or in part in various elements of the system, including devices 102, 122, and 124, or any other device of the system.

The logic 118 may operate to interpret recognition of touching as a confirmation that pairing is to occur. Some of the information needed to effect pairing may be communicated prior to the time of contact. For example, the devices 102,104 may both have antennas 115 116 supporting wireless communication and may pass some pairing information when in proximity but before making contact. More communication to effect pairing may then occur, as necessary, after the two devices 102 and 104 have been touched.

The logic 118 may include logic to enable the devices 102,104 to obtain pairing information, at least in part, via the physical contact point 110, 111 or 113. The logic 118 may touching of both devices 102 and 104 to be simultaneous in order to effect pairing. The logic 118 may provide for interrupting or ending the pairing process if contact with one or both devices 102, 104 is broken. The logic 118 may provide for enabling the devices 102 and 104 to wirelessly exchange information needed for pairing only during activation of the contact sensors 110 and 111 or 113 of both devices 102, 104.

Manner of Contact

The system may include logic 118 to ascertain a manner in which contact with one or both devices 102, 104 is accomplished. By identifying a manner of contact, other information is provided by the contact beyond the fact of contact. The additional information may be used to determine that pairing is, in fact, intended. For example, pairing might be recognized as intended if each device is touched for at least some number of seconds.

The additional information obtained from the manner of pairing may be used during pairing effectuation. For example, the additional information may act to authenticate (identify) and/or authorize a user of the device(s) 102,104. For example, moving the touching finger 128 vertically up and down three times could act to authorize pairing. The additional information may act to identify how to proceed with pairing, e.g. in what manner and/or to what extent to pair the devices. For example, touching and, at the same time, rotating the device 102 clockwise could indicate that pairing should occur between a headset and a telephone base, with connection to the office. Counterclockwise rotation could mean pairing between the headset and the base, with a connection to a relative's home.

The system may include logic 118 to determine which contact area (such as 111 or 113) or areas are being touched.

The system may include logic 118 to ascertain relative motion between one or both devices 102 and/or 104, and/or a finger or fingers contacting one or both devices 102, 104. The system may include logic 118 to ascertain at least one of rotation, angle of incidence, or relative lateral and/or circular motion between the devices 102 and 104 and/or the fingers and one or both devices 102, 104. Determining relative lateral motion may include logic to recognize that the finger 128 which has touched the device 104 is moving across one or more of the contact points 111 or 113, how fast, and/or in what relative direction.

The system may include logic 118 to determine the orientation of one device 102 with respect to the touching instrument at the time of contact. For example, logic 118 may determine that the long axis of device 102 is oriented horizontally with respect to the long axis of the touching finger 128. Determining the orientation of one device 102 with respect to a touching instrument may include determining the orientation of one contact area 110 on device 102 with respect to the touching instrument such as a touching finger 128.

The logic 118 may operate to detect duration of contact with one or both devices 102 and/or 104. The logic 118 may operate to detect multiple instances of contact for one device or both 102 and/or 104. For example, a user 128 touching the device 102 may tap it on the contact area 110 a number of times to indicate that pairing is wanted and authorized to some particular second device 104. The logic 118 may operate to detect an intensity of contact for one device or both 102 and/or 104, for example, to detect at least one of an average contact force, a peak contact force, or force gradient.

All manner of touching information gained may be used when to effect a pairing, to identify the intent to pair, to identify the purpose and extent of pairing, to authenticate/authorize, and to configure, or to provide any other information needed to accomplish pairing.

Relative Motion Before or After Contact

The logic 118 may operate to ascertain relative motion between the devices 102,104 prior to or after contact. Information about relative motion may be applied for various purposes, including authentication and/or authorization. For example, the user may be required to swing the device 102 to and fro when proximate to the device 104 within a certain number of seconds of touching in order for the pairing to be authorized. Ascertaining relative motion prior to or after contact may include use of the wireless capabilities of the devices 102,104.

Authorization/Authentication

The system may include logic 118 to authenticate and/or authorize pairing between the devices 102,104. Authenticating and/or authorizing the pairing may include identifying one or both devices 102,104 and/or identifying at least one device characteristic for one or both devices 102,104, such as determining whether the devices 102,104 are suitable for use for the purpose required and that they 102,104 are compatible for pairing to accomplish that purpose. For example, pairing may have been initiated with a goal of accomplishing a commercial transaction requiring secure communication. Both devices 102,104 may have a device characteristic of supporting one or more varieties of encryption. However, they 102, 104 may support only DES encryption in common. The recognition that the devices 102,104 are compatible and that DES encryption should be employed may occur as a result of the information exchanged during the pairing effectuation process. The system may include logic to authorize that a person using one or both devices 102 and 104 is authorized to do so, and/or to what extent. Authenticating and/or authorizing pairing may include identifying the user who is touching one or both of the devices 102 or 104 and/or identifying at least one characteristic of the user. For example, the user may be a member of a group, department, or organization, such as a computer network administrator with broad access privileges.

The system may include logic 118 to interpret activation of the contact sensors 110 111 and/or 113 of one or both devices 102 and/or 104 as an indication to initiate exchange between the devices 102 and 104 of at least some of authentication, authorization, or compatibility information needed for pairing. The system may include logic 118 to interpret signals indicating that the devices 102 and 104 have been touched as an indication that the authentication, authorization, or compatibility information (which may have been obtained in communication occurring prior to touching) should be applied to complete pairing.

The system may include logic to authorize an extent of pairing of the devices 102,104. By extent of pairing it is meant authorization of which functions and how extensively certain functions can be performed while the devices 102,104 are paired. Authorization of an extent of pairing may be based, at least in part, on the identity or at least one characteristic of the user. Authorization of an extent of pairing may be based, at least in part, on the identity of the devices 102,104 or device characteristics or state.

Authorization of an extent of pairing may be based, at least in part, on the manner of touching and/or point of physical contact 110 111 113 between the two devices 102,104. The system may include logic 118 to authorize paired access the extent of which varies according to an amount of area touched on one or both devices 102,104. The system may include logic 118 to determine an extent of pairing based at least in part upon which device 102 or 104 is touched first. Authorization may be provided for a greater number and/or different functions and/or features of one or both devices 102,104 than would be available if the devices 102 and 104 were paired without touching.

Authorization of an extent of pairing may be based, at least in part, on time of day or physical location.

The system may include logic 118 to establish a secure channel between the devices 102 and 104 for communication of pairing information. Establishment of a secure channel may particularly be used to communicate authentication/authorization information. Establishment of a secure channel may depend on the purpose for which pairing is being established and the capabilities of the devices 102,104. In some cases the secure channel established during pairing effectuation will also be used after the devices 102,104 are paired for continuing device communications. In some cases the devices 102,104 will reestablish communications, if needed, when pairing actually occurs, using the same or different physical mechanisms.

System Feedback

The system may include logic 118 to provide one or more audible and/or visual and/or tactile indications on the progress and/or results of pairing of the devices 102 and 104. The system may include logic 118 to provide at least one of one or more lights, tones, vibrations, sounds, or display indications. Tactile, vibration, or other feedback may be provided through the contact point(s) 110 111 113 for one or both devices 102,104. The device 102 may include feedback capabilities such as a speaker 107 and/or LED 108. The device 104 is shown as including a display 120 for feedback purposes, among other things.

The system may include logic 118 to provide a first indication when the first device 102 is touched, and logic 118 to provide a second indication when the second device 104 is touched.

Providing feedback may include providing at least one menu of pairing options, such as might be presented on a display 120 or by the speaker 107. Examples of pairing options are a reason for pairing and/or task to be performed, options or attributes to affect the extent of pairing and/or pairing configuration, and so on.

Providing feedback may include providing an indication that a user should provide input to the pairing process. Such inputs could include speech, keyboard entry, pressing a switch, performing a scan, or taking an action or actions involving the contact points 110 111 113 of the devices 102, 104. The feedback may indicate that the user should provide at least one of a password, spoken input, biometric input, or information from a card and/or memory device.

The system may include at least one of logic 118 to provide an indication that pairing was successful, unsuccessful due to insufficient available information, to indicate that pairing between the devices 102 and 104 is available, or to indicate that pairing is in process.

System Communication with Other Devices

The system may include logic 118 to communicate wirelessly or in some other manner with at least one device 122 124 different than the two devices 102,104 being paired, in order to obtain information needed to effect pairing between the devices 102,104. The other device or devices 122 124 may be physically near (same or close room or same building) or remotely located with respect to the location of the pairing devices 102,104. The other device or devices 122 124 may be accessed wirelessly, or via a network such as an intranet or the Internet.

The system may include at least one proximate desktop, laptop, or handheld computing device which may be used, at least in part, to effect pairing.

System User Input

The system may include logic 118 to await user input as a result of activation of one or more of the contact sensors 110 111 113 on one or both devices 102,104. The system may include logic 118 to await authentication information for the user. The system may include logic to await at least one of input from a keypad, voice input, or biometric input. The system may await actions to be taken by the user, such as touching for a certain approximate duration of time, touching multiple times in a pattern, or touching one of the devices 104 at a different contact point 113 or 111 from the original touch, or other actions.

Proximity Between Devices

The logic 118 may operate to detect increasing proximity between the devices 102,104 and to interpret activation of one or both of the contact sensors 110 111 113, in conjunction with recently detected increasing proximity between the devices 102 and 104, as an indication that pairing of the devices 102 and 104 should be effected.

The system may include logic 118 to enable the devices 102 and 104 to wirelessly exchange information needed for pairing, upon the devices 102 and 104 approaching or becoming proximate with one another, but prior to activation of contact sensors 110 111 113 of one or both devices 102 and/or 104, and logic 118 to interpret activation of the contact sensors 110 111 113 of one or both devices 102 and/or 104 as an indication that the information should be applied to complete the pairing process.

Figure 2:
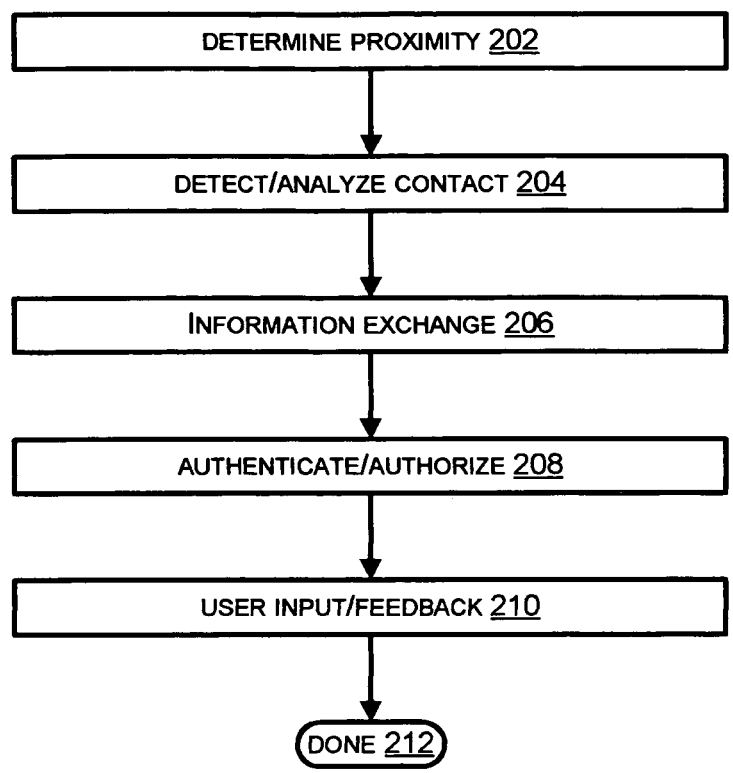
FIG. 2 is a flow chart of an embodiment of a device pairing method.

FIG. 2 is a flow chart of an embodiment of a device pairing method.

Overview of FIG. 2

At 202, the devices are recognized as proximate. This may take place, for example, in situations where the devices communicate prior to being touched. At 204, one or both devices detect that they have been touched, e.g., that their contact sensors 110 111 113 have been activated. Information about the manner of touching may be analyzed. At 206, information is exchanged between the two devices to effect pairing. As was previously noted, some or possibly all of this information may have been exchanged earlier in situations where the devices were communicating with each other prior to the touching. At 208, information obtained prior to, during, or after contact is applied to authenticate and/or authorize the pairing of the devices. At 210, feedback is provided to the user and user input obtained. Feedback and user input may occur as a part of the authentication and authorization process 208, or for other reasons. At 212, the pairing effectuation process is complete.

Proximity

The method may include wirelessly exchanging information needed for pairing between the devices, upon the devices becoming proximate with one another, but prior to contact with the devices, and interpreting contact with the devices as an indication to complete pairing of the devices. Activation of one or more contact sensors, in conjunction with recently detected increasing proximity between the devices, may provide an indication that pairing of the devices should be attempted. Information for pairing the devices may be exchanged wirelessly, upon the devices becoming proximate with one another, but prior to activation of one or more contact sensors, and activation of the one or more contact sensors may provide an indication to complete pairing of the devices. In some cases, the pairing effectuation process may begin on activation of one contact sensor and information may be exchanged, but pairing is not completed until it is confirmed by actuation of another contact sensor on the other device.

Although in many embodiments the same individual may touch both devices, and they may therefore likely be proximate at the time of touching; in some cases two different individuals may be doing the touching, one for each device. In that situation the devices may be situated further apart at the time of touching. These devices may communicate wirelessly or through a wired network to effect pairing.

Relative Motion/Rotation/Angle Before During or After Contact

Relative motion between the devices may be applied to influence the pairing process, and/or the extent of pairing undertaken. The method may include ascertaining relative motion between the devices. The method may include ascertaining at least one of rotation, relative angle, or relative lateral motion of the devices. The method may include use of the wireless communications capabilities of the devices to determine relative motion.

Contact

The method may include detecting physical contact of a person with a first device and with a second device, and effecting pairing between the first and second device as a result of detecting the physical contact of the person with the first and second devices. Contact may result in initiating an exchange between the devices of at least some of authentication, authorization, or compatibility information needed for pairing. The devices may exchange pairing information prior to, during, only during, or after a time when the devices are one or both being touched.

The method may include effecting pairing between devices upon detection of simultaneous physical contact with both devices by the person.

The method may include detecting contact with the first device, followed by contact with the second device, as an indication that pairing of the devices should be effected.

The method may include the devices exchanging information needed for pairing via points where the devices are touched. A previous example discussed information exchange via the contact points using a cable.

The method may include interrupting the pairing process if contact is lost with one or both of the devices.

The method may include the devices wirelessly exchanging pairing information only during a time when contact is made with one or both of the devices. This may occur naturally, if, for example, touching is effected by a cable through which the pairing information is exchanged. It may also be designed to ensure that touching did not occur for some reason other than effecting pairing.

Manner of Contact

The method may include ascertaining a manner in which contact with one or both devices is accomplished. The information gained may be used for any purpose during pairing effectuation, but will frequently be applied for authentication and/or authorization.

The method may include ascertaining the manner is which one or more fingers touch one or both devices.

The method may include ascertaining at least one of rotation, angle of approach, or relative lateral motion of one or more fingers at one or points of contact with one or more of the devices.

The method may include interpreting a duration of contact with one or both devices as an indication of how and/or whether pairing of the devices should proceed and/or be accomplished.

The method may include interpreting multiple instances of contact with one or both devices as an indication of how and/or whether pairing of the devices should proceed and/or be accomplished.

The method may include interpreting the intensity of contact with one or both devices as an indication of how and/or whether pairing of the devices should proceed and/or be accomplished.

The method may include interpreting at least one of an average contact force, a peak contact force, or force gradient as the indication of how and/or whether pairing of the devices should proceed and/or be accomplished.

Authorization/Authentication

The pairing process, and the extent of pairing effected, may involve authentication and/or authorization of a user of the device or devices, and/or the devices themselves, as previously discussed. For example, identification of one or both of the devices, or identification of a user of one or both of the devices, and/or characteristics thereof, may be involved in the pairing process.

The method may include touching a first of the devices initiating exchange between the devices of at least some of authentication, authorization, or compatibility information needed for pairing.

The method may include the devices communicating wirelessly to obtain information needed to effect pairing with one another.

The method may include authorizing an extent of pairing of the devices according to at least one of identification of one or both of the devices, or identification of a user of one or both of the devices.

The method may include authorizing access to a greater number and/or different functions of one or both devices than would be available if the devices were paired without contact taking place to one or both devices.

The method may include authorizing access to functions and/or features of one or both devices to an extent of which varies according to the manner and/or point of contact with one or both devices.

The method may include authorizing that the user may use one or both devices, and/or to what extent.

Feedback

In many instances, the system user will need to know how the process to effect pairing is proceeding. The method may include providing one or more audible and/or visual and/or tactile indications on the progress and/or results of pairing of the devices.

User Input

The method may include prompting for user input as a result of contact occurring with one or both devices. The method may include providing an indication that the user should provide at least one of input from a keypad, voice input, or biometric input. The method may include prompting for authentication information for the user.

Figure 3:
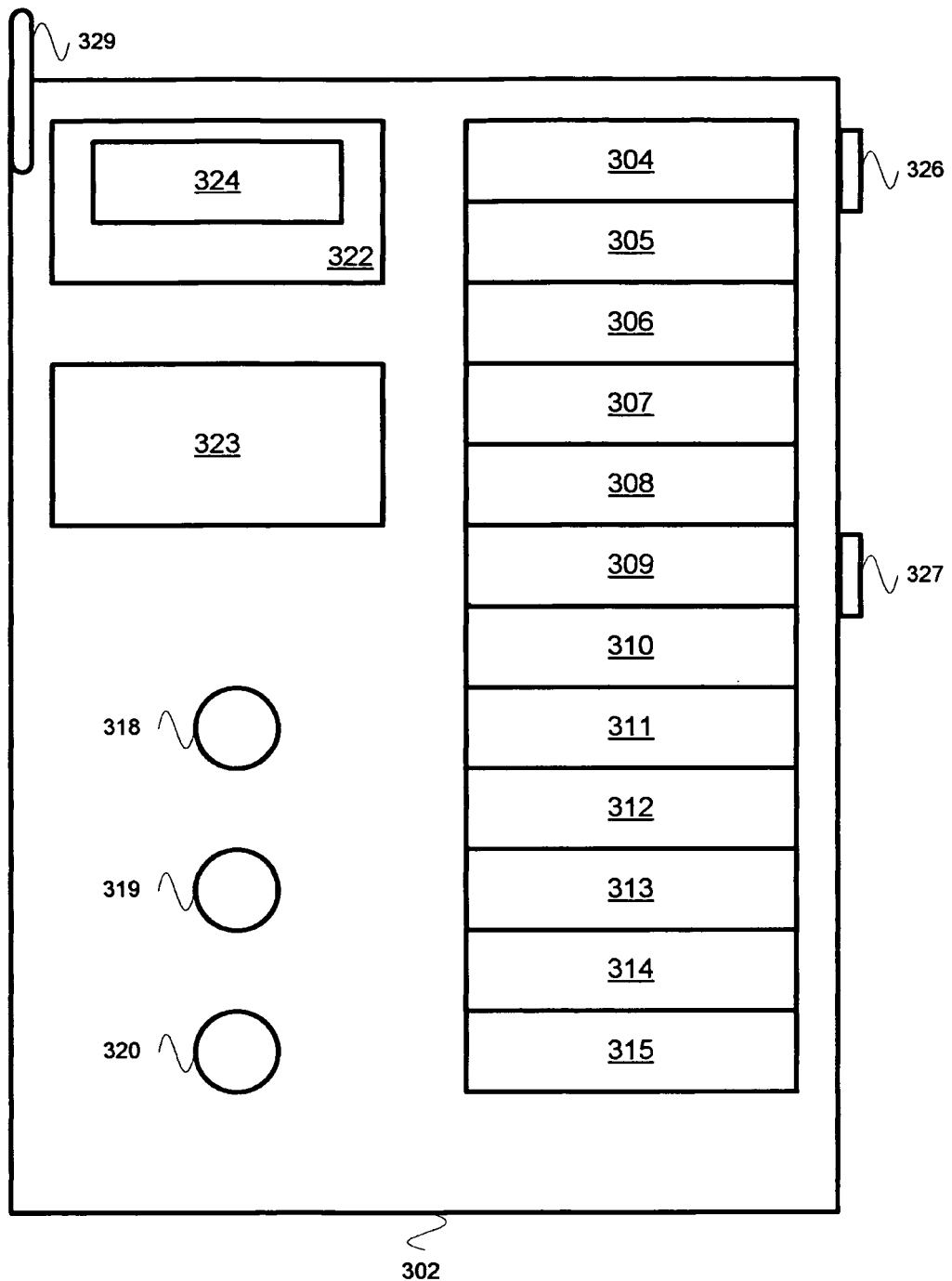
FIG. 3 is a block diagram of an embodiment of a device to accommodate pairing.

FIG. 3 is a block diagram of an embodiment of a device to accommodate pairing.

Overview of FIG. 3

A device 302 includes a display 322 that may be used, among other things, to provide a menu 324 of options. The device 302 includes a microphone 318 which may be used to detect sound (such as tapping) and/or voice input. The device 302 includes a keypad 323. The device 302 includes two parts which may be used to provide user feedback, a speaker 319 and a LED 320. The device 302 includes two contact sensors 326 and 327. The device 302 also includes various logic elements which may operate to effect device pairing. Of course, the device 302 may include additional elements that are not shown here and which are superfluous to this discussion.

Device logic includes pairing process management logic 304, contact processing logic 305, wireless communication logic 306, proximity and motion logic 307, user input logic 308, speech processing logic 309, biometric processing logic 310, third device interface logic 311 to interact with a device or devices other that the two pairing devices, authentication logic 312, authorization logic 313, feedback logic 314, logic 315 to discontinue pairing, retain pairing information, and/or reestablish/resume pairing under certain circumstances.

An antenna 329 enables the device 302 to engage in wireless communication.

Not all embodiments of the device 302 will include all of the illustrated logic. For example, if a device 302 did not have a speaker 319 or microphone 318 and performed no audible inputs or outputs, it would not need and probably would not have speech processing logic 309. If a device 302 had no biometric input it would not need and probably would not have biometric processing logic 310. And so on.

Device Contact

The device 302 may include at least one contact sensor 326 or 327, and logic to cause the device 302 to, upon activation of the contact sensor 326 or 327, wait for a signal from another device indicating that the other device has been touched, and upon receiving the signal, undertaking pairing with the other device.

The device 302 may include logic 305 to cause the device 302, upon activation of the contact sensor 326 or 327, to wait for a limited amount of time for the signal indicating that the other device has been touched, and if such signal is not received within the limited amount of time, to cause the device 302 to stop waiting for the signal.

The device 302 may include one or more one touch-sensitive areas, temperature-sensitive areas, or conductivity-sensitive areas which may act as contact sensors 326 or 327.

The device 302 may include logic 305 to enable the device 302 to exchange with the other device information needed for pairing via physical contact points 326 or 327 of the device 302 and other device.

The device 302 may include logic 304 and 305 to interrupt the pairing process if contact with the device or other device is broken.

The device 302 may include logic 306 to enable the device 302 to wirelessly exchange with the other device information needed for pairing only during activation of its 302 contact sensor 326 or 327, or only during activation of its 302 contact sensor 326 and 327 and after receiving the signal indicating that the other device has been touched.

Device Manner of Contact

The device 302 may include logic 305 to ascertain a manner in which contact with the device 302 is accomplished. Ascertaining manner of contact provides additional information that may be used while pairing is being effected, most often, authentication/authorization information.

The device 302 may include logic 305 to ascertain relative motion between the device 302 and a finger or other touching instrument that is touching the device 302.

The device 302 may include logic 305 to ascertain at least one of rotation, angle of incidence, or relative lateral and/or circular motion between the device 302 and the touching instrument.

The device 302 may include logic 305 to detect a duration of contact. The logic 305 may interpret the duration of contact as an indication of how and/or whether pairing of the device 302 and the other device should proceed.

The device 302 may include logic 305 to detect multiple instances of contact. The logic 305 may interpret the multiple instances of contact as an indication of how and/or whether pairing of the device 302 and the other device should proceed.

The device 302 may include logic 305 to detect an intensity of contact. The logic 305 may interpret the intensity of contact as an indication of how and/or whether pairing of the device 302 and the other device should proceed.

The device 302 may include logic 305 to detect at least one of an average contact force, a peak contact force, or force gradient.

Device Authentication/Authorization

The device 302 may include logic 304 to interpret activation of at least one of the contact sensors 326 327 as an indication to initiate exchange with the other device of at least some of authentication, authorization, or compatibility information needed for pairing, and to interpret the signal indicating that the other device has been touched as an indication that the authentication, authorization, or compatibility information should be applied to complete pairing with the other device.

The device 302 may include logic to authenticate 312 and/or authorize 313 pairing with the other device. The device 302 may include logic to establish a secure channel for communication of pairing information, frequently including authentication and/or authorization information.

The device 302 may include logic to switch from one pairing partner to another as a result of activation of the contact sensors 326 327.

The device 302 may include logic 313 to authorize an extent of pairing of the device and the other device.

The device 302 may include logic 313 to authorize paired access to a greater number and/or different functions of one or both devices than would be available if the devices were paired without each device being touched.

The device 302 may include logic 313 to authorize paired access the extent of which varies according to the manner and/or point of physical contact with the device 302 and/or the other device.

The device 302 may include logic 313 to authorize that a person using one or both devices is authorized to do so, and/or to what extent.

The device 302 may include logic to determine an extent of pairing based at least in part upon which device is touched first.

The device 302 may include logic 313 to authorize paired access the extent of which varies according to an amount of area touched on one or both devices.

Device Feedback

The device 302 may include feedback (e.g. speaker 319, LED 320 and feedback operation logic 314) to provide one or more audible and/or visual and/or tactile indications on the progress and/or results of pairing. Logic 314 may provide for indications of at least one of lights, tones, vibrations, sounds, or display indications. Logic 314 may provide at least one menu 324 of pairing options. Logic 314 may provide an indication that a user should provide input to the pairing process.

The device 302 may include logic 314 to provide a first indication when the first device 302 is touched, and logic 314 to provide a second indication when the second device is touched.

The device 302 may include at least one of logic 314 to provide an indication that pairing was successful, unsuccessful due to insufficient available information, to indicate that pairing between the devices is available, or to indicate that pairing is in process.

The device 302 may include logic 314 to provide an indication that the user should provide at least one of a password, spoken input, biometric input, or information from a card and/or memory device.

Device Communication with Other Devices

The device 302 may include logic 311 to communicate wirelessly with at least one device (a third device) different than the other device (its pairing partner) to obtain information needed to effect pairing with the other device. The device 302 may include logic 311 to communicate using wired communication with at least one different device (the third device). The third device or different devices may be proximate or located remotely over a network. The third device or different devices may include at least one proximate desktop, laptop, or handheld computing device.

Device User Input

The device 302 may include logic 308 to await user input as a result of activation of the contact sensor 326 or 327 and, in some situations, the signal indicating that the other device has been touched The device 302 may include logic 308 to await authentication information for the user. The device 302 may include logic 308 to await at least one of input from a keypad, voice input 309, or biometric input 310.

Device Motion/Rotation/Angle

The device 302 may include logic to ascertain relative motion between the device and the other device. The device 302 may include logic to ascertain at least one of rotation of one device with respect to the other, angle between the devices, or relative lateral motion of the devices.

Device Proximity

The device 302 may include logic 307 to detect proximity and/or increasing proximity with the other device and to interpret activation of the contact sensor 326 or 327, in conjunction with recently detected increasing proximity with the other device, as an indication that preparation to pair with the other device should be initiated.

The device 302 may include logic 306 to enable the device to wirelessly exchange with the other device information needed for pairing, upon approaching or becoming proximate with the other device, but prior to activation of the contact sensor 326 or 327, and logic to interpret activation of the contact sensor 326 or 327 as an indication that the information should be applied to complete the pairing process upon receiving the signal indicating that the other device has been touched.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A device comprising:
    circuitry configured to detect touch contact associated with at least one contact point of the device;
    circuitry configured to authenticate at least one individual based at least partly on fingerprint information obtained at least partly through the at least one contact point of the device, the circuitry configured to authenticate at least one individual including at least circuitry configured to authorize an extent of pairing of the device and at least one other device according to at least one of identification of at least one of the device and the at least one other device, and identification of a user of at least one of the device and the at least one other device including:
        circuitry configured to authorize access to functions and/or features of at least one of the device and the at least one other device to an extent of which varies according to the manner and/or point of contact with at least one of the device and the at least one other device; and
    circuitry configured to wirelessly transmit encrypted payment information from the device to the at least one other device to accomplish at least one commercial transaction at least partly in response to authentication of the at least one individual.

2. The device of claim 1, wherein the circuitry configured to detect touch contact associated with at least one contact point of the device comprises:
    circuitry configured to at least one of: (i) detect at least one instance of touch contact associated with at least one contact point of the device, (ii) detect touch contact associated with at least one touch screen portion of the device, (iii) detect touch contact associated with at least one contact sensor of the device, (iv) detect at least one intensity of touch contact associated with at least one contact point of the device, (v) detect at least one location of touch contact associated with at least one contact point of the device, (vi) detect touch contact associated with at least one display of the device, (vii) detect at least one force of touch contact associated with at least one contact point of the device, (viii) detect at least one touching a finger vertically up and down one or more times, (ix) detect at least one rotation, (x) detect an angle of incidence, (xi) detect a relative lateral motion, or (xii) detect a circular motion.

3. The device of claim 1, further comprising:
    circuitry configured to scan at least one fingerprint.

4. The device of claim 1, wherein the circuitry configured to wirelessly transmit encrypted payment information from the device to the at least one other device to accomplish at least one commercial transaction at least partly in response to authentication of the at least one individual comprises:
    circuitry configured to wirelessly transmit encrypted payment information from the device to the at least one other device to accomplish at least one commercial transaction using at least one third device at least partly in response to authentication of the at least one individual.

5. The device of claim 1, further comprising:
    circuitry configured to obtain information from at least one card and/or memory device.

6. The device of claim 1, further comprising:
    circuitry configured to detect proximity between the device and at least one other device.

7. The device of claim 1, wherein the device comprises one or more of:
    a camera, a keyboard, a scanner, a cellular telephone, a wearable article, headphones, a personal digital assistant, a telephone, a laptop, a desktop, a tower, a server, a medical patient monitoring station, a machine control application, a network device, a medallion, a ring, or a palmtop.

8. The device of claim 1, further comprising:
    circuitry configured for causing at least one vibration at least partly in response to effecting pairing of the device with the at least one other device to accomplish the at least one commercial transaction.

9. A method comprising:
    detecting touch contact associated with at least one contact point of the device;
    authenticating at least one individual based at least partly on fingerprint information obtained at least partly through the at least one contact point of the device, the authenticating at least one individual including at least authorizing an extent of pairing of the device and at least one other device according to at least one of identification of at least one of the device and the at least one other device, and identification of a user of at least one of the device and the at least one other device including:
        authorizing access to a greater number and/or different functions of at least one of the device and the at least one other device than would be available if the at least one of the device and the at least one other device were paired without detecting the touch contact associated with at least one contact point of the device; and
    wirelessly transmitting encrypted payment information from the device to the at least one other device to accomplish at least one commercial transaction at least partly in response to authentication of the at least one individual.

10. A system comprising:
    circuitry configured to detect touch contact associated with at least one contact point of a device;
    circuitry configured to authenticate at least one individual based at least partly on fingerprint information obtained at least partly through the at least one contact point of the device, the circuitry configured to authenticate at least one individual including at least circuitry configured to authorize an extent of pairing of the device and at least one other device according to at least one of identification of at least one of the device and the at least one other device, and identification of a user of at least one of the device and the at least one other device including:

circuitry configured to authorize access to a greater number and/or different functions of at least one of the device and the at least one other device than would be available if the at least one of the device and the at least one other device were paired without detecting the touch contact associated with at least one contact point of the device; and circuitry configured to wirelessly transmit encrypted payment information to accomplish at least one commercial transaction at least partly in response to authentication of the at least one individual.

11. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize access to functions and/or features of at least one of the device and the at least one other device to an extent of which varies according to the manner and/or point of contact of the detected touch contact associated with at least one contact point of the device.

12. The device of claim 1, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize access to a greater number and/or different functions of at least one of the device and the at least one other device than would be available if the at least one of the device and the at least one other device were paired without contact taking place to at least one of the device and the at least one other device.

13. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize access to functions and/or features of at least one of the device and the at least one other device to an extent of which varies according to the manner and/or point of contact with at least one of the device and the at least one other device.

14. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize a person to use at least one of the device and the at least one other device.

15. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize what extent a person is authorized to use at least one of the device and the at least one other device.

16. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to determine an extent of pairing between at least one of the device and the at least one other device based at least in part upon which device is touched first.

17. The device of claim 10, wherein the circuitry configured to authenticate at least one individual including at least circuitry configured to authorize an extent of pairing of the device and the at least one other device according to at least one of identification of at least one of the device and the at least one other device, and identification of a user of at least one of the device and the at least one other device comprises:

circuitry configured to authorize an extent of paired access between at least one of the device and the at least one other device that varies based at least in part upon an amount of area touched on one or both devices of at least one of the device and the at least one other device.

\* \* \* \* \*